(12) United States Patent
Takizawa et al.

(10) Patent No.: US 6,826,825 B2
(45) Date of Patent: Dec. 7, 2004

(54) METHOD FOR MANUFACTURING A MAGNETIC RECORDING MEDIUM

(75) Inventors: Naoki Takizawa, Nagano (JP); Hiroyuki Uwazumi, Nagano (JP); Takahiro Shimizu, Nagano (JP); Tadaaki Oikawa, Nagano (JP)

(73) Assignee: Fuji Electric Co., Ltd., Kawasaki (JP)

( * ) Notice: Subject to any disclaimer, the term of this patent is extended or adjusted under 35 U.S.C. 154(b) by 350 days.

(21) Appl. No.: 09/992,540

(22) Filed: Nov. 6, 2001

(65) Prior Publication Data

US 2002/0095767 A1 Jul. 25, 2002

(30) Foreign Application Priority Data

Nov. 9, 2000 (JP) ........................................ 2000-342486

(51) Int. Cl.⁷ .......................... G11B 5/127; H04R 31/00
(52) U.S. Cl. .................. 29/603.13; 29/426.2; 29/426.3; 29/603.01; 29/603.02; 29/603.11; 29/609; 204/192.15; 360/131; 360/132; 360/133; 427/129; 427/130
(58) Field of Search ............................ 29/426.2, 426.3, 29/603.01, 603.02, 603.11, 603.13, 609; 204/192.15; 360/131, 132, 133; 427/129, 130

(56) References Cited

U.S. PATENT DOCUMENTS

| | | | |
|---|---|---|---|
| 5,679,473 A | 10/1997 | Murayama et al. | ......... 428/694 |
| 5,815,343 A | 9/1998 | Ishikawa et al. | |
| 6,069,820 A | * 5/2000 | Inomata et al. | ............. 365/171 |
| 6,071,607 A | 6/2000 | Okuyama et al. | |
| 6,383,404 B1 | * 5/2002 | Sakai et al. | .................... 216/97 |
| 6,403,240 B1 | * 6/2002 | Kanbe et al. | .......... 428/694 TS |
| 6,482,329 B1 | * 11/2002 | Takahashi et al. | ............ 216/22 |

FOREIGN PATENT DOCUMENTS

| | | | |
|---|---|---|---|
| EP | 0 892 393 A1 | 1/1999 | |
| JP | 63317922 A | * 12/1988 | ............ G11B/5/66 |
| JP | 07057237 A | * 3/1995 | ............ G11B/5/66 |
| JP | 08255342 | 10/1996 | |
| JP | 2806443 | 9/1998 | |

OTHER PUBLICATIONS

"Magnetic properties of Fe/Ti multilayered films for a magnetic recording medium"; Ono, S.; Nitta, M.; Naoe, M.; Magnetics, IEEE Transactions on , vol.: 25 , Issue: 5 , Sep. 1989; pp.:3872–3874.*

Kadokura S; Naoe M, "Deposition of perpendicular magnetic recording Co–Cr layers with nanosize domains using a plasma enhanced type of sputtering apparatus", Journal of Applied Physics, vol. 85, No. 8, pp. 6127–6129, Apr. 15, 1999.

* cited by examiner

Primary Examiner—A. Dexter Tugbang
Assistant Examiner—Paul D Kim
(74) Attorney, Agent, or Firm—Darby & Darby

(57) ABSTRACT

A manufacturing method achieves excellent magnetic recording characteristics by sequentially sputtering a non-magnetic under-layer, a non-magnetic intermediate layer, and a magnetic layer on a non-magnetic substrate in an atmosphere of $H_2O$ partial pressure of $2 \times 10^{-10}$ Torr or lower. This process allows beneficial deposition of the magnetic layer and reduces raw materials costs. The magnetic layer includes ferromagnetic grains and non-magnetic grain boundaries. The intermediate layer has a hexagonal close-packed crystal structure. The manufacturing method allows manufacture of a high quality magnetic recording medium without a heating step thereby allowing use of lower cost materials, reduces manufacturing time, and increases savings.

12 Claims, 2 Drawing Sheets of a unit of reversed magnetization. Therefore, it is additionally desirable to suppress the exchange interaction between the grains and minimize the unit of reversed magnetization itself (represented by an activation magnetic moment).

METHOD FOR MANUFACTURING A MAGNETIC RECORDING MEDIUM

BACKGROUND OF THE INVENTION

1. Field of the Invention

The present invention relates to a method for manufacturing a magnetic recording medium. The present invention also relates to a magnetic recording medium produced the method.

2. Description of the Related Art

Demand is rising for magnetic recording mediums with increased recording density and lower cost. To adequately meet this demand, it is critical that magnetic thin films have both high coercive force and low noise. Accordingly, alternative compositions and structures for a magnetic layer, a non-magnetic under-layer, and various laminating methods have been proposed.

Japanese Patent No. 2806443 provides a magnetic recording medium with high coercive force by controlling oxygen concentration in a metallic under-layer and/or a ferromagnetic layer at 100 wt ppm or less. In this disclosure, a magnetic recording medium has a ferromagnetic metal layer formed directly on a substrate or through an under-layer on a substrate. The ferromagnetic metal layer disclosed is composed of a cobalt-base alloy. The materials for the metallic under-layer include chromium, titanium, tungsten and alloys of these metals.

Recently a magnetic layer, commonly called a granular magnetic layer, has been proposed. This granular magnetic layer commonly has a structure composed of magnetic grains and a surrounding non-magnetic non-metallic substance, such as oxide or nitride.

Japanese Unexamined Patent Application Publication No. H8-255342, discloses a method for attaining low recording noise by forming a granular recording layer in which ferromagnetic grains are dispersed in a non-magnetic film. This publication discloses a manufacturing method comprising the steps of sequentially depositing a non-magnetic film, a ferromagnetic film and a non-magnetic film on a non-magnetic substrate, and heat-treating the laminate.

The magnetic layer in this disclosure includes a main component of cobalt or an alloy containing cobalt. The non-magnetic film is either a metal, an oxide, a nitride, carbon, or carbide.

U.S. Pat. No. 5,679,473 discloses a granular recording film in which each magnetic grain is surrounded and individually separated by a non-magnetic oxide. The recording film is formed by means of RF (radio frequency) sputtering using a CoNiPt target containing an oxide, such as $SiO_2$. This type of recording film achieves a high coercive force Hc and a low noise.

According to this disclosure, low noise is achieved for the following reason. Since each of the magnetic grains in this granular magnetic film is physically separated by a grain boundary of non-magnetic non-metallic phase, magnetic interaction between the magnetic grains is reduced and formation of the magnetic domain wall with a zigzag shape at the transition region of a recording bit is sufficiently suppressed.

Noise in a recording medium is caused by fluctuation of magnetization due to magnetic interaction between magnetic grains (that constitute the medium), and the size of the grains. To maintain high signal-to-noise ratio (SNR), sufficient to sustain enhancement of the recording density, it is necessary to hold the number of magnetic grains per bit cell at greater than a certain value. In other words, it is necessary to minimize the magnetic grain size.

Unfortunately, where large exchange interaction arises between the magnetic grains, the minimization of magnetic grains frequently does not necessarily result in minimization of a unit of reversed magnetization. Therefore, it is additionally desirable to suppress the exchange interaction between the grains and minimize the unit of reversed magnetization itself (represented by an activation magnetic moment).

To further aid the goals of minimization, and prevent the creation of a superparamagnetic state, each magnetic grain must have a relatively large value for energy of magnetic anisotropy. This large energy value materially aids creation of the magnetic characteristic (large Hc/Mrt value) essential for high-resolution recording.

Unfortunately, to achieve the objective of the above-described granular structure (high SNR), where magnetic grains with high energy of magnetic anisotropy are dispersed in a non-magnetic matrix, very rigorous requirements must be met.

In conventionally used Co—Cr alloy magnetic films, chromium is segregated from a cobalt alloy magnetic grain toward a grain boundary by deposition at high temperature. This process reduces magnetic interaction between the magnetic grains. Additionally, since the grain boundary phase in the granular magnetic layer is a non-magnetic non-metallic substance, the segregation more easily occurs than with conventional chromium. Consequently, magnetic grain isolation is easily enhanced.

In a conventional Co—Cr alloy magnetic layer, heating the substrate over about 200° C. is essential for sufficient segregation of chromium when laminating the magnetic layer. In the above-mentioned method of Japanese Patent No. 2806443, heating the substrate to a temperature between 60 to 150° C. was necessary. The disclosed granular magnetic layer had the advantage of allowing partial segregation of the non-magnetic non-metallic substance in lamination without heating.

Unfortunately, formation of magnetic recording mediums having a granular magnetic layer requires adding a relatively large amount of platinum to the cobalt alloy. This large amount of platinum allows the magnetic recording medium to obtain the desired magnetic characteristics, particularly high coercive force Hc. Specifically, to attain a desired coercive force Hc of 2,800 Oe, additions of as high as 16 at % platinum is needed. This additional platinum is very expensive. In the conventional CoCr metallic magnetic films, only about 8 at % platinum is added to obtain the same value of Hc.

With rising recording density demand, high He over 3,000 Oe are desirable. This demand unfortunately leads to use of additional platinum and increased manufacturing costs, both contrary to a desire for lower price.

As a further manufacturing difficulty, adding platinum increases media noise, also contrary to consumer demand. Consequently, additional control of the granular magnetic layer is necessary to reduce media noise and costs.

OBJECTS AND SUMMARY OF THE INVENTION

It is an object of the present invention to provide a magnetic recording medium and manufacturing method which overcomes the drawbacks of the related art noted above.

It is another object of the present invention to provide a method for manufacturing a magnetic recording medium, having a granular magnetic layer, and exhibiting high coerce force, low cost, and low media noise.

It is another object of the present invention to provide a magnetic recording medium manufactured by the present method.

The present invention relates to a magnetic recording medium and method for manufacturing which achieves excellent magnetic recording characteristics by sequentially sputtering a non-magnetic under-layer, a non-magnetic intermediate layer, and a magnetic layer on a substrate in an atmosphere of $H_2O$ partial pressure of $2\times10^{-10}$ Torr or lower. This process allows beneficial deposition of the magnetic layer and reduces raw materials costs. The magnetic layer includes ferromagnetic grains and non-magnetic grain boundaries. The intermediate layer has a hexagonal close-packed crystal structure. The manufacturing method allows manufacture of a high quality magnetic recording medium without a heating step thereby allowing lower cost materials use, reducing time, and increased savings.

According to one embodiment of the present invention there is provided a method for manufacturing a magnetic recording medium, comprising the steps of: laminating a non-magnetic under-layer on the non-magnetic substrate by sputtering in an atmosphere having a partial pressure of $H_2O$ of $2\times10^{-10}$ Torr or below, laminating a non-magnetic intermediate layer on the non-magnetic under-layer by sputtering in an atmosphere having a partial pressure of $H_2O$ of $2\times10^{-10}$ Torr or below, laminating a magnetic layer on the intermediate layer by sputtering in an atmosphere having a partial pressure of $H_2O$ of $2\times10^{-10}$ Torr or below, the magnetic layer comprising at least ferromagnetic grains and grain boundaries surrounding the grains, laminating a protective layer on the magnetic layer, and laminating a liquid lubricant layer on the protective layer.

According to another embodiment of the present invention there is provided a method for manufacturing a magnetic recording medium, wherein: the non-magnetic intermediate layer is made of at least a metal selected from the group consisting of Ti, Cr, Zr, Hf, Ti alloy, Cr alloy, Zr alloy and Hf alloy, and the non-magnetic intermediate layer has a hexagonal close-packed crystal structure.

According to another embodiment of the present invention there is provided a method for manufacturing a magnetic recording medium, wherein: the non-magnetic intermediate layer has a thickness of from 0.5 nm to 20 nm.

According to another embodiment of the present invention there is provided a method for manufacturing a magnetic recording medium, wherein: the non-magnetic grain boundary is composed of at least one of an oxide and a nitride of at least one element selected from the group consisting of Mg, Al, Si, Ti, Cr, Mn, Co, Zr, Ta, W and Hf.

According to another embodiment of the present invention there is provided a method for manufacturing a magnetic recording medium, wherein: the under-layer is composed of at least one of chromium and a chromium alloy.

According to another embodiment of the present invention there is provided a method for manufacturing a magnetic recording medium, wherein: the non-magnetic substrate is composed of a material selected from the group consisting of a crystallized glass, a chemically strengthened glass and a plastic.

According to another embodiment of the present invention there is provided a method for manufacturing a magnetic recording medium, wherein: the steps of laminating the non-magnetic under-layer, laminating the non-magnetic intermediate layer, laminating the magnetic layer, the step of laminating the protective layer, and the step of laminating the liquid lubricant layer are conducted without a step of heating.

According to another embodiment of the present invention there is further provided a magnetic recording medium, manufactured by a method for manufacturing a magnetic recording medium.

According to another embodiment of the present invention there is provided a method for manufacturing a magnetic recording medium, comprising the steps of: selecting a non-magnetic substrate, laminating a non-magnetic under-layer on a non-magnetic substrate by sputtering in an atmosphere having a partial pressure of $H_2O$ of $2\times10^{-10}$ Torr or below, laminating a non-magnetic intermediate layer on the non-magnetic under-layer by sputtering in an atmosphere having a partial pressure of $H_2O$ of $2\times10^{-10}$ Torr or below, the non-magnetic intermediate layer made of at least a metal selected from the group consisting of Ti, Cr, Zr, Hf, Ti alloy, Cr alloy, Zr alloy and Hf alloy, the non-magnetic intermediate layer having a hexagonal close-packed crystal structure, and the non-magnetic intermediate layer having a thickness of from 0.5 nm to 20 nm, laminating a magnetic layer on the intermediate layer by sputtering in an atmosphere having a partial pressure of $H_2O$ of $2\times10^{-10}$ Torr or below, the magnetic layer comprising at least ferromagnetic grains and grain boundaries surrounding the grains, laminating a protective layer on the magnetic layer, and laminating a liquid lubricant layer on the protective layer.

According to another embodiment of the present invention there is provided a method for manufacturing a magnetic recording medium, comprising the steps of: selecting a non-magnetic substrate, laminating anon-magnetic under-layer on a non-magnetic substrate by sputtering in an atmosphere having a partial pressure of $H_2O$ of $2\times10^{-10}$ Torr or below, laminating a non-magnetic intermediate layer on the non-magnetic under-layer by sputtering in an atmosphere having a partial pressure of $H_2O$ of $2\times10^{-10}$ Torr or below, the non-magnetic intermediate layer made of at least a metal selected from the group consisting of Ti, Cr, Zr, Hf, Ti alloy, Cr alloy, Zr alloy and Hf alloy, the non-magnetic intermediate layer having a hexagonal close-packed crystal structure, and the non-magnetic intermediate layer having a thickness of from 0.5 nm to 20 nm, laminating a magnetic layer on the intermediate layer by sputtering in an atmosphere having a partial pressure of $H_2O$ of $2\times10^{-10}$ Torr or below, the magnetic layer comprising at least ferromagnetic grains and grain boundaries surrounding the grains, laminating a protective layer on the magnetic layer, laminating a liquid lubricant layer on the protective layer, and conducting the steps of laminating without a step of heating.

According to another embodiment of the present invention there is provided a method for manufacturing a magnetic recording medium, comprising the steps of: selecting a non-magnetic substrate, laminating a non-magnetic under-layer on a non-magnetic substrate by sputtering in an atmosphere having a partial pressure of $H_2O$ of $2\times10^{-10}$ Torr or below, laminating a non-magnetic intermediate layer on the non-magnetic under-layer by sputtering in an atmosphere having a partial pressure of $H_2O$ of $2\times10^{-10}$ Torr or below, the non-magnetic intermediate layer made of at least a metal selected from the group consisting of Ti, Cr, Zr, Hf, Ti alloy, Cr alloy, Zr alloy and Hf alloy, the non-magnetic intermediate layer having a hexagonal close-packed crystal structure, and the non-magnetic intermediate layer having a thickness of from 0.5 nm to 20 nm, laminating a magnetic layer on the intermediate layer by sputtering in an atmosphere having a partial pressure of $H_2O$ of $2\times10^{-10}$ Torr or below, the magnetic layer comprising at least ferromagnetic grains and non-magnetic grain boundaries surrounding the grains, the non-magnetic grain boundaries being composed of at least one of an oxide and a nitride of at least one element selected from the group consisting of Mg, Al, Si, Ti, Cr, Mn, Co, Zr, Ta, W and Hf, laminating a protective layer on the magnetic layer, and laminating a liquid lubricant layer on the protective layer.

According to another embodiment of the present invention there is provided a method for manufacturing a magnetic recording medium, comprising the steps of: selecting a non-magnetic substrate, laminating a non-magnetic under-layer on a non-magnetic substrate by sputtering in an atmosphere having a partial pressure of $H_2O$ of $2\times10^{-10}$ Torr or below, laminating a non-magnetic intermediate layer on the non-magnetic under-layer by sputtering in an atmosphere having a partial pressure of $H_2O$ of $2\times10^{-10}$ Torr or below, the non-magnetic intermediate layer made of at least a metal selected from the group consisting of Ti, Cr, Zr, Hf, Ti alloy, Cr alloy, Zr alloy and Hf alloy, the non-magnetic intermediate layer having a hexagonal close-packed crystal structure, and the non-magnetic intermediate layer having a thickness of from 0.5 nm to 20 nm, laminating a magnetic layer on the intermediate layer by sputtering in an atmosphere having a partial pressure of $H_2O$ of $2\times10^{-10}$ Torr or below, the magnetic layer comprising at least ferromagnetic grains and non-magnetic grain boundaries surrounding the grains, the non-magnetic grain boundaries being composed of at least one of an oxide and a nitride of at least one element selected from the group consisting of Mg, Al, Si, Ti, Cr, Mn, Co, Zr, Ta, W and Hf, laminating a protective layer on the magnetic layer, laminating a liquid lubricant layer on the protective layer, and conducting the steps of laminating without a step of heating.

The above, and other objects, features and advantages of the present invention will become apparent from the following description read in conjunction with the accompanying drawings, in which like reference numerals designate the same elements.

DETAILED DESCRIPTION OF THE PREFERRED EMBODIMENTS

The inventors of the present invention have conducted rigorous studies in an effort to achieve a combination of high coercive force, low cost, and low noise in a magnetic recording medium having a granular magnetic layer. Through these studies, the inventors have determined that high coercive force and low media noise are achieved without increasing the content of expensive platinum when the ultimate pressure of the sputtering apparatus is improved and the sputtering is performed under a clean atmosphere.

Specifically, the inventors have determined a method for manufacturing a magnetic recording medium including multiple steps linked to the above discovery, as will be discussed. The steps include forming a non-magnetic under-layer on a non-magnetic substrate by sputtering under an atmosphere having a partial pressure of $H_2O$ of $2\times10^{-10}$ Torr or lower. A second step includes forming a non-magnetic intermediate layer on the under-layer by sputtering under an atmosphere having a partial pressure of $H_2O$ of $2\times10^{-10}$ Torr or lower. A third step includes forming a magnetic layer comprising ferromagnetic grains and non-magnetic grain boundaries surrounding the grains on the intermediate layer by sputtering under an atmosphere having a partial pressure of $H_2O$ of $2\times10^{-10}$ Torr or lower. Additional steps include forming a protective layer on the magnetic layer, and forming a liquid lubricant layer on the protective layer.

Advantageously, the non-magnetic intermediate layer is made of a metal selected from the group consisting of Ti, Cr, Zr, Hf, Ti-alloy, Cr-alloy, Zr-alloy and Hf-alloy and having a hexagonal close-packed crystal structure.

Advantageously, the intermediate layer has a thickness of from about 0.5 nm to about 20 nm. The non-magnetic grain boundary in the magnetic layer is composed of oxide or nitride of at least one element selected from the group consisting of Mg, Al, Si, Ti, Cr, Mn, Co, Zr, Ta, W and Hf.

The non-magnetic under-layer is composed of chromium or a chromium alloy, and the non-magnetic substrate is composed of crystallized glass, chemically strengthened glass or plastic.

As an additional benefit to the present invention, the steps of forming the under-layer, the intermediate layer, the magnetic layer, the protective layer, and the liquid lubricant layer are completed without advance-heating the non-magnetic substrate.

The present invention also provides a magnetic recording medium manufactured by the method described above.

Figure 1:
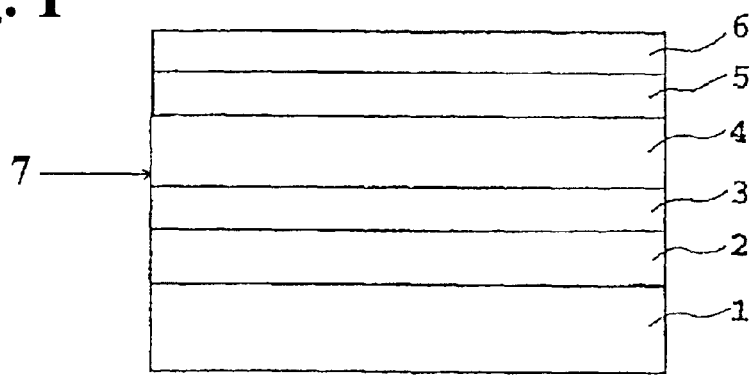
FIG. 1 is a cross-sectional view of a magnetic recording medium obtained by a manufacturing method according to the present invention.

Referring now to FIG. 1, a magnetic recording medium 7 includes a non-magnetic under-layer 2, a non-magnetic intermediate layer 3, a magnetic layer 4, and a protective layer 5 sequentially formed on a non-magnetic substrate 1. A liquid lubricant 6 is layered on protective layer 5 and provides additional protection. Magnetic layer 3 is a granular magnetic layer.

Non-magnetic substrate 1 maybe selected from many materials including, but not limited to, NiP-plated aluminum alloy, strengthened glass, or crystallized glass. Alternative non-magnetic substrates 1, may be made by injection-molding a polycarbonate, a polyolefin or other resin detrimentally affected by heating. The use of resins is a particular advantage of the present invention since the instant invention does not require a thermal step.

Non-magnetic under-layer 2 is formed on non-magnetic substrate 1 by a sputtering method. To achieve the desired benefits noted above, it is preferable to lower the ultimate pressure of the sputter chamber and keep the partial pressure of $H_2O$ at or about $2\times10^{-10}$ Torr or below. Keeping the partial pressure of $H_2O$ to such a low level establishes a beneficial clean processing atmosphere.

Non-magnetic under-layer 2 is composed of a non-magnetic material including NiAl and Cr. Chromium or chromium alloy is preferably used for the under-layer and the preferable chromium alloys include CrMo, CrTi, CrV and CrW. A thickness of under-layer 2 is preferably in the range from about 5 nm to about 50 nm.

Non-magnetic intermediate layer 3 is formed on under-layer 2 by a sputtering. During sputter deposition of non-magnetic intermediate layer 3, it is preferable to lower the ultimate pressure of the sputter chamber and keep the partial pressure of $H_2O$ at about $2\times10^{-10}$ Torr or lower. As noted above, keeping the partial pressure of $H_2O$ at such a level provides a clean sputtering atmosphere and beneficially effects the magnetic properties of magnetic recording medium 7, as will be described.

Intermediate layer 3 is a material selected from the group consisting of Ti, Cr, Zr, Hf, Ti alloys, Cr alloy, Zr alloy, and Hf alloy, and has a hexagonal close-packed crystal structure.

In an effort to improve the surface condition for the following step of forming granular magnetic layer 4, intermediate layer 3 'getters' (chemically and electrically gets) oxygen from under-layer 2 and has a metallic surface that contains essentially no oxygen.

This effort allows beneficial modification of the initial growth of granular magnetic layer 4 (on intermediate layer 3), and the quantity of the platinum retained in the homogeneously grown ferromagnetic grains increases, resulting in readily achievable high coercive force.

Thickness of intermediate layer 3 is preferably in the range from about 0.5 nm to about 20 nm.

As noted above, magnetic layer 4 (granular magnetic layer 4) is sputtered onto intermediate layer 3. During sputter of magnetic layer 4, it is preferable to lower the ultimate pressure of the sputter chamber and reduce the partial pressure of $H_2O$ to about $2\times10^{-10}$ Torr or lower. As noted above, the reduction in $H_2O$ establishes a clean atmosphere.

Magnetic layer 4 (granular magnetic layer 4) generally consists of a plurality of ferromagnetic grains and non-magnetic grain boundaries surrounding the grains. The non-magnetic grain boundary material is composed of an oxide or a nitride of a metal or silicon. This type of structure is producible by a sputtering method, under the sputtering condition described above, using a target of a ferromagnetic metal containing the oxide or nitride of the selected grain boundary material.

A CoPt alloy is preferably used for the ferromagnetic (crystal) material. To additionally reduce media noise, it is preferable to include in the ferromagnetic CoPt alloy material an element selected from the group consisting of Cr, Ni and Ta.

An oxide or a nitride of at least one element selected from a group consisting of Mg, Al, Si, Ti, Cr, Mn, Co, Zr, Ta, W and Hf is particularly favorable to form the non-magnetic grain boundary material. This construction forms a preferably stable granular structure. Thickness of magnetic layer 4 is a value selected to provides enough head reproduction output when reproducing a record.

Protective layer 5 is sputtered onto magnetic layer 4. Protective layer 5 is a thin film mainly composed of carbon. A liquid lubricant layer 6, composed of a perflouropolyether lubricant is formed on protective layer 5 to complete magnetic recording medium 7.

The process of the present invention allows production of magnetic recording medium 7 having a high coercive force and a low media noise without a heating step as required in the conventional manufacturing process. Removal of the heating step simplifies manufacture, reduces costs and time, and allows the use of inexpensive resin or plastic substrates.

The following are some examples of embodiments of the present invention. One skilled in the art should recognize that the scope of the present invention is not limited by the specific examples provided.

EXAMPLE 1

A plurality of chemically strengthened glass substrates with smooth surfaces (N-10 glass substrates manufactured by Hoya Corp.), were used for substrates in Example 1.

After precision cleaning, the set of substrates was introduced into a sputtering apparatus under a partial pressure of $H_2O$ at $3\times10^{-10}$ Torr. On each substrate 1, a non-magnetic under-layer 2, having thickness of 15 nm was formed of Cr-20 at % Mo by a DC magneton sputtering method under an argon gas pressure of 5 mTorr.

On each under-layers 2, a non-magnetic intermediate layer 3 having thickness of 10 nm was formed of Co-40 at % Cr by a DC magneton sputtering method under an argon gas pressure of 5 mTorr.

On each intermediate layer 3, a granular magnetic layer 4, having varied thickness from 12 nm to 28 nm, corresponding to the product Brδ of remanent magnetic flux density Br and film thickness δ in the range from 55 to 130 G μm, was formed by an RF sputtering method using a target of Co-12 at % Cr-12 at % Pt containing 10 mol % of $SiO_2$ under an argon gas pressure of 3 mTorr.

On each of granular magnetic layer 4, a carbon protective layer 5, having thickness of 10 nm, was formed by sputtering. Thereafter, the set of laminates was removed from the vacuum chamber.

On each of protective layer 5, a liquid lubricant layer 6, having thickness of 1.5 nm was formed by applying a liquid lubricant. Thus producing a set of magnetic recording media 7 with a structure as shown in FIG. 1.

According to the present invention and Example 1, heating of substrate 1 prior to lamination was not conducted.

Figure 2:
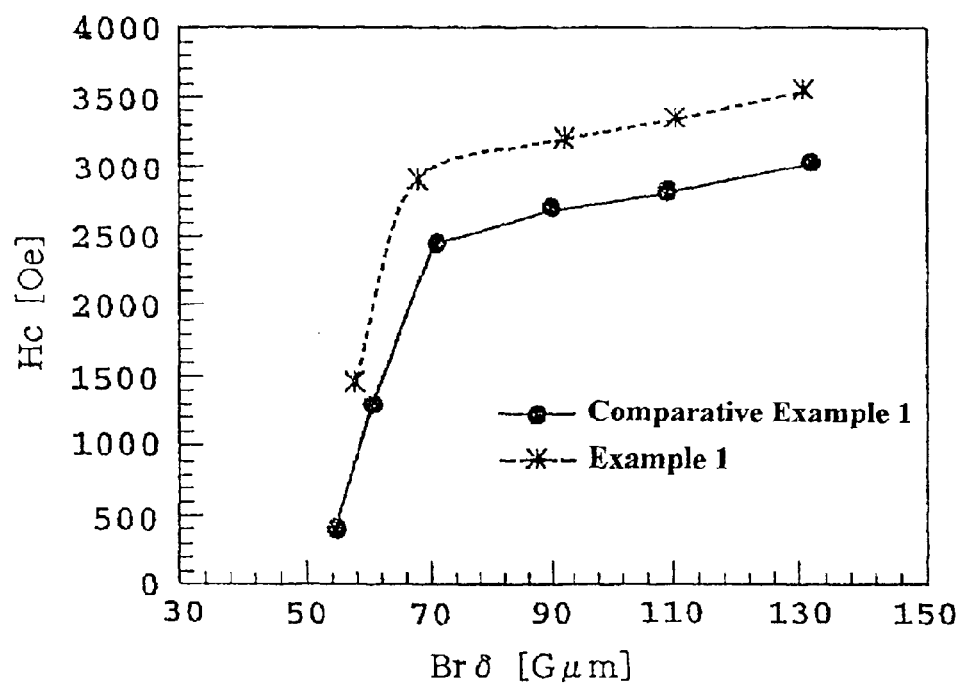
FIG. 2 is a graph indicating dependence of coercive force (Hc) on the product Brδ of 'remanent' magnetic flux density Br and film thickness δ of the magnetic layer of the magnetic recording media produced in Example 1 and Comparative Example 1.

Referring now to FIG. 2, on each of the obtained magnetic recording media 7, coercive force Hc was measured using a vibrating sample magnetometer (VIM). The dependence of the coercive force Hc on the product Brδ of remanent magnetic flux density Br and film thickness δ can be clearly seen in the figure. On magnetic recording mediums 7 having thickness of 15 nm , which corresponds to the Bδ of 70 G μm, signal-to-noise ratio (SNR) was measured by using a GMR head on a spinning stand tester.

Comparative Example 1

Figure 3:
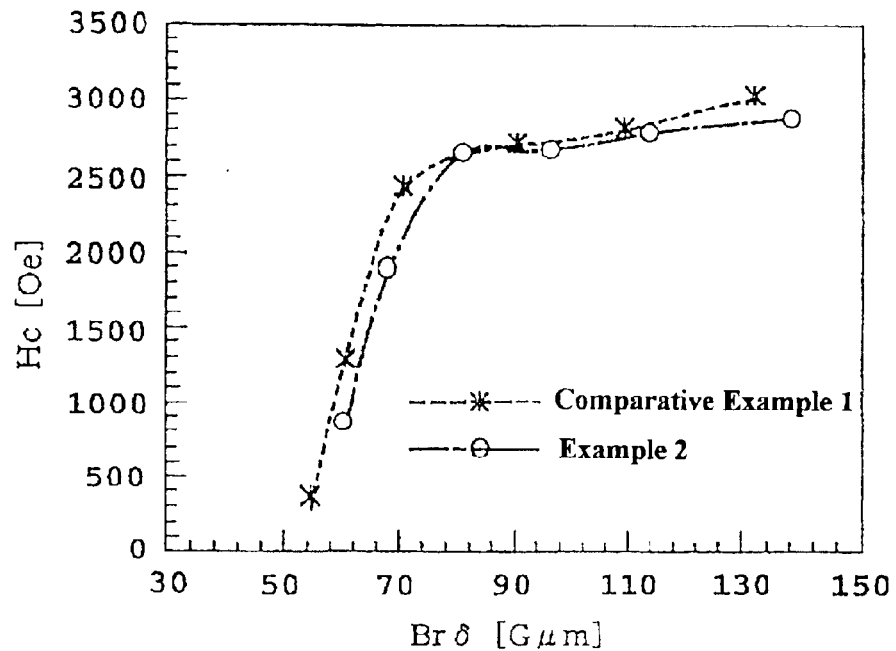
FIG. 3 is a graph showing dependence of coercive force (Hc) on the product Brδ of remanent magnetic flux density Br and film thickness δ of the magnetic layer of the magnetic recording media produced in Example 2 and Comparative Example 1.
Figure 4:
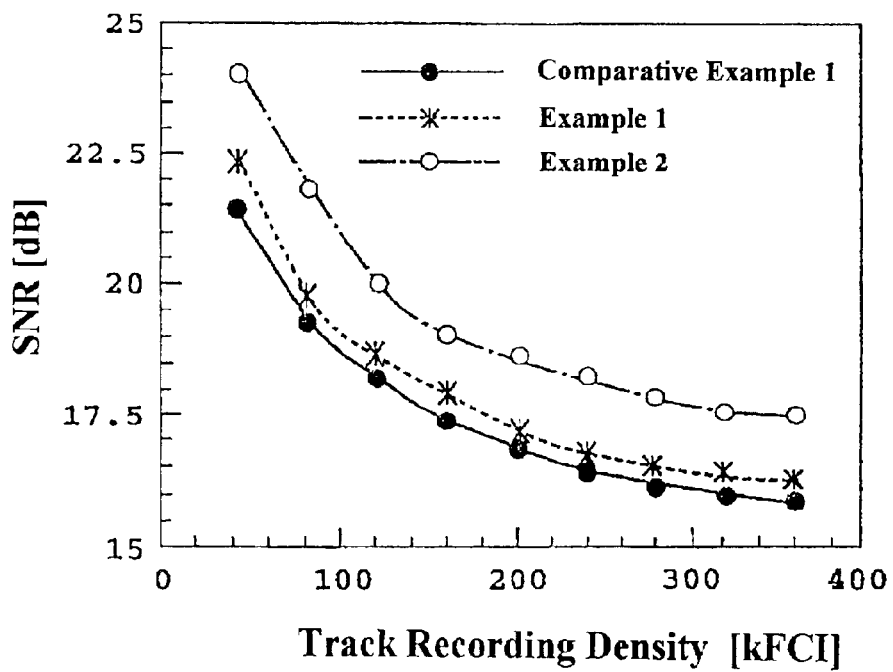
FIG. 4 is a graph showing the dependence of signal-to-noise ratio (SNR) on the track recording density of the magnetic recording medium produced in Example 1, Example 2, and Comparative Example 1.

Referring additionally to FIGS. 3, and 4, a set of magnetic recording media 7, was produced in the same manner as in Example 1 except that under-layer 2, intermediate layer 3 and magnetic layer 4 were formed in the sputtering apparatus under a partial pressure of $H_2O$ at $4\times10^{-10}$ Torr.

Coercive force Hc was measured on each of the obtained magnetic recording media 7 in the same manner as in Example 1. The dependence of the coercive force Hc on the product Brδ is clearly shown in FIGS. 2 and 3. The signal-to-noise ratio (SNR) was measured in the same manner as in Example 1 on the magnetic recording medium of this Comparative Example 1 having thickness of 15 nm, which corresponding to the Brδ of 70 G μm that generates equal output to that of a medium of Example 1 having thickness of 15 nm. The signal-to-noise ration (SNR) effects are clearly shown in FIG. 4.

EXAMPLE 2

A set of magnetic recording media 7 was produced in the same manner as in Example 1 except that granular magnetic layer 6 was formed using a target of Co-12 at % Cr-10 at % Pt containing 10 mol % of $SiO_2$, in which the platinum content was decreased by 2 at % as compared with both Example 1 and Comparative Example 1.

Coercive force Hc was measured on each of the obtained magnetic recording media 7 in the same manner as in Example 1. The dependence of the coercive force Hc on the product Brδ is clearly shown in FIG. 2.

The signal-to-noise ratio SNR was measured on the set of magnetic recording media 7 of this example having thickness of 14 nm, which corresponds to the Brδ of 70 G μm and generates essentially equal output to that of a magnetic recording medium 7 of Example 1 having thickness of 15 nm. This comparison is shown in FIG. 4.

As is apparent from FIG. 2, dependence (slope) of coercive force Hc on thickness of magnetic layer 4 shifts to a higher Hc side by decreasing the partial pressure of $H_2O$. The coercive force Hc in the case of partial pressure of $H_2O$ at $3 \times 10^{-11}$ Torr and a magnetic layer thickness of 15 nm, (that is, a specimen of Example 1), was 3,000 Oe, while Hc in the case of the partial pressure of $H_2O$ of $4 \times 10^{-10}$ Torr and magnetic layer 4 thickness of 15 nm, (that is, a specimen of Comparative Example 1), was 2,500 Oe. The coercive force Hc was enhanced by 500 Oe. The values of the product Brδ of remanent magnetic flux density and film thickness for both media were the same and equal to 70 G μm.

As is apparent from FIG. 3, even where the platinum content of granular magnetic layer 3 was decreased by 2 at % to the value of 10 at % (the specimens of Example 2), similar coercive force Hc values were attained with the case of $H_2O$ partial pressure at $4 \times 10^{-10}$ Torr and platinum content of 12 at % by virtue of lowering of $H_2O$ partial pressure.

The dependence of signal-to-noise ratio (SNR) on track recording density shown in FIG. 4 indicates that the most favorable SNR characteristics were obtained with lowered $H_2O$ partial pressure and reduced platinum content, as with the specimens of Example 2.

One skilled in the art should recognize that by improving ultimate pressure of the sputtering apparatus and by performing sputtering under a clean atmosphere, high coercive force (Hc) is achieved and the platinum content may be correspondingly reduced.

The result of the instant invention, is that magnetic recording media 7 having excellent noise characteristics are easily produced with a reduction in manufacturing costs and an improvement of overall media characteristics.

More favorable effects are obtained when non-magnetic intermediate layer 3 is formed from substance selected from the group consisting of Ti, Cr, Zr, Hf, Ti alloy, Cr alloy, Zr alloy and Hf alloy, and has a hexagonal close-packed crystal structure.

Since high coercive force is achieved by employing the method and the composition of the present invention, substrate heating is no longer necessary and the production process is simplified and made faster. Removing the heating step in forming magnetic recording media 7 also allows the use of less expensive resins and plastics further reducing costs ans speeding production.

Having described preferred embodiments of the invention with reference to the accompanying drawings, it is to be understood that the invention is not limited to those precise embodiments, and that various changes and modifications may be effected therein by one skilled in the art without departing from the scope or spirit of the invention as defined in the appended claims.

What is claimed is:

1. A method for manufacturing a magnetic recording medium, comprising the steps of:
   laminating a non-magnetic under-layer on a non-magnetic substrate by sputtering in an atmosphere having a partial pressure of $H_2O$ of $2 \times 10^{-10}$ Torr or below;
   laminating a non-magnetic intermediate layer on said non-magnetic under-layer by sputtering in an atmosphere having a partial pressure of $H_2O$ of $2 \times 10^{-10}$ Torr or below;
   laminating a magnetic layer on said intermediate layer by sputtering in an atmosphere having a partial pressure of $H_2O$ of $2 \times 10^{-10}$ Torr or below;
   the step of laminating said magnetic layer including laminating to form at least ferromagnetic grains and non-magnetic grain boundaries surrounding said grains;
   laminating a protective layer on said magnetic layer, and
   laminating a liquid lubricant layer on said protective layer.

2. The method, according to claim 1, wherein:
   said non-magnetic intermediate layer is made of at least a metal selected from the group consisting of Ti, Cr, Zr, Hf, Ti alloy, Cr alloy, Zr alloy and Hf alloy; and
   said non-magnetic intermediate layer has a hexagonal close-packed crystal structure.

3. The method, according to claim 1, wherein:
   said non-magnetic intermediate layer has a thickness of from 0.5 nm to 20 nm.

4. The method, according to claim 1, wherein: said non-magnetic grain boundary is composed of at least one of an oxide and a nitride of at least one element selected from the group consisting of Mg, Al, Si, Ti, Cr, Mn, Co, Zr, Ta, W and Hf.

5. The method, according to claim 1, wherein:
   said under-layer is composed of at least one of chromium and a chromium alloy.

6. The method, according to claim 1, wherein:
   said non-magnetic substrate is composed of a material selected from the group consisting of a crystallized glass, a chemically strengthened glass and a plastic.

7. The method, according to claim 1, wherein:
   said steps of laminating said non-magnetic under-layer, laminating said non-magnetic intermediate layer, laminating said magnetic layer, said step of laminating said protective layer, and said step of laminating said liquid lubricant layer include omitting heating during the performance of these steps.

8. The method, according to claim 1, wherein said non-magnetic intermediate layer made of at least a metal selected from the group consisting of Ti, Cr, Zr, Hf, Ti alloy, Cr alloy, Zr alloy and Hf alloy; said non-magnetic intermediate layer having a hexagonal close-packed crystal structure, and said non-magnetic intermediate layer having a thickness of from 0.5 nm to 20 nm; and
   wherein said steps of laminating are conducted without a step of heating.

9. The method, according to claim 1, wherein said non-magnetic intermediate layer being at least one of a metal selected from the group consisting of Ti, Cr, Zr, Hf, Ti alloy, Cr alloy, Zr alloy and Hf alloy;
   said non-magnetic intermediate layer having a hexagonal close-packed crystal structure;

said non-magnetic intermediate layer having a thickness of from 0.5 nm to 20 nm;

said non-magnetic grain boundaries being composed of at least one of an oxide and a nitride of at least one element selected from the group consisting of Mg, Al, Si, Ti, Cr, Mn, Co, Zr, Ta, W and Hf; and omitting heating during said steps of laminating.

10. The method of claim 1, wherein heating is omitted during and prior to the step of laminating a magnetic layer on said intermediate layer by sputtering in an atmosphere having a partial pressure of $H_2O$ of $2\times10^{-10}$ Torr or below.

11. A method for manufacturing a magnetic recording medium, comprising the steps of:

laminating a non-magnetic under-layer on a non-magnetic substrate by sputtering in an atmosphere having a partial pressure of $H_2O$ of $2\times10^{-10}$ Torr or below;

laminating a non-magnetic intermediate layer on said non-magnetic under-layer by sputtering in an atmosphere having a partial pressure of $H_2O$ of $2\times10^{-10}$ Torr or below, said non-magnetic intermediate layer made of at least a metal selected from the group consisting of Ti, Cr, Zr, Hf, Ti alloy, Cr alloy, Zr alloy and Hf alloy; said non-magnetic intermediate layer having a hexagonal close-packed crystal structure, and said non-magnetic intermediate layer having a thickness of from 0.5 nm to 20 nm;

laminating a magnetic layer on said intermediate layer by sputtering in an atmosphere having a partial pressure of $H_2O$ of $2\times10^{-10}$ Torr or below, said magnetic layer comprising at least ferromagnetic grains and grain boundaries surrounding said grains, laminating a protective layer on said magnetic layer, and laminating a liquid lubricant layer on said protective layer.

12. A method for manufacturing a magnetic recording medium, comprising the steps of:

selecting a non-magnetic substrate;

laminating a non-magnetic under-layer on a said non-magnetic substrate by sputtering in an atmosphere having a partial pressure of $H_2O$ of $2\times10^{-10}$ Torr or below;

laminating a non-magnetic intermediate layer on said non-magnetic under-layer by sputtering in an atmosphere having a partial pressure of $H_2O$ of $2\times10^{-10}$ Torr or below, said non-magnetic intermediate layer made of at least a metal selected from the group consisting of Ti, Cr, Zr, Hf, Ti alloy, Cr alloy, Zr alloy and Hf alloy; said non-magnetic intermediate layer having a hexagonal close-packed crystal structure, and said non-magnetic intermediate layer having a thickness of from 0.5 nm to 20 nm;

laminating a magnetic layer on said intermediate layer by sputtering in an atmosphere having a partial pressure of $H_2O$ of $2\times10^{-10}$ Torr or below, said magnetic layer comprising at least ferromagnetic grains and non-magnetic grain boundaries surrounding said grains, said non-magnetic grain boundaries being composed of at least one of an oxide and a nitride of at least one element selected from the group consisting of Mg, Al, Si, Ti, Cr, Mn, Co, Zr, Ta, W and Hf;

laminating a protective layer on said magnetic layer, and laminating a liquid lubricant layer on said protective layer.

* * * * *